Patented July 7, 1925.

1,544,735

UNITED STATES PATENT OFFICE.

MINA W. GLEESON, OF CHICAGO, ILLINOIS.

LIQUID METAL CLEANER.

No Drawing.   Application filed June 24, 1924.  Serial No. 722,067.

*To all whom it may concern:*

Be it known that I, MINA W. GLEESON, a citizen of the United States, residing at Chicago, in the county of Cook and State of Illinois, have invented new and useful Improvements in Liquid Metal Cleaners, of which the following is a specification.

The object of this invention is the production of a polishing composition especially adapted for use in polishing and cleaning aluminum and other metals.

This composition consists of carbon tetrachloride which is a liquid solvent; rottenstone which is an abrasive; and oil preferably paraffin oil and Venetian red employed for coloring.

In preparing the composition I prefer to use the ingredients in about the following proportions:

|  | Ounces. |
|---|---|
| Carbon tetrachloride | 3 |
| Paraffin oil | 5 |
| Rottenstone | 16 |
| Venetian red | 1 |

These ingredients are prepared by placing the paraffin oil, carbon tetrachloride and Venetian red in the mixer adding the rottenstone until a saturated solution is produced. The resulting solution is then mixed for two hours and allowed to stand for twenty four hours and then mixed until it has the consistency of thick cream.

This is a cold process and not affected by temperature. It will not scratch or mar any surface. It may be applied with a soft cloth and allowed to stand a short time and then rubbed thoroughly. After this the article which may be of aluminum or the like is rinsed in hot soapy water and dried with a clean cloth.

In placing the composition on the market it may be contained in collapsible tubes, jars or the like.

A composition produced in accordance with this invention will thoroughly remove all dirt and tarnish and will restore the article to its original luster.

Having thus described this invention, what is claimed is:

1. A cleaning and polishing compound consisting of carbon tetrachloride, paraffin oil, and rottenstone.

2. A cleaning and polishing compound for metal consisting of carbon tetrachloride three ounces, paraffin oil five ounces, and rottenstone sixteen ounces and Venetian red one ounce.

In testimony whereof I affix my signature.

MINA W. GLEESON.